Figure 1:
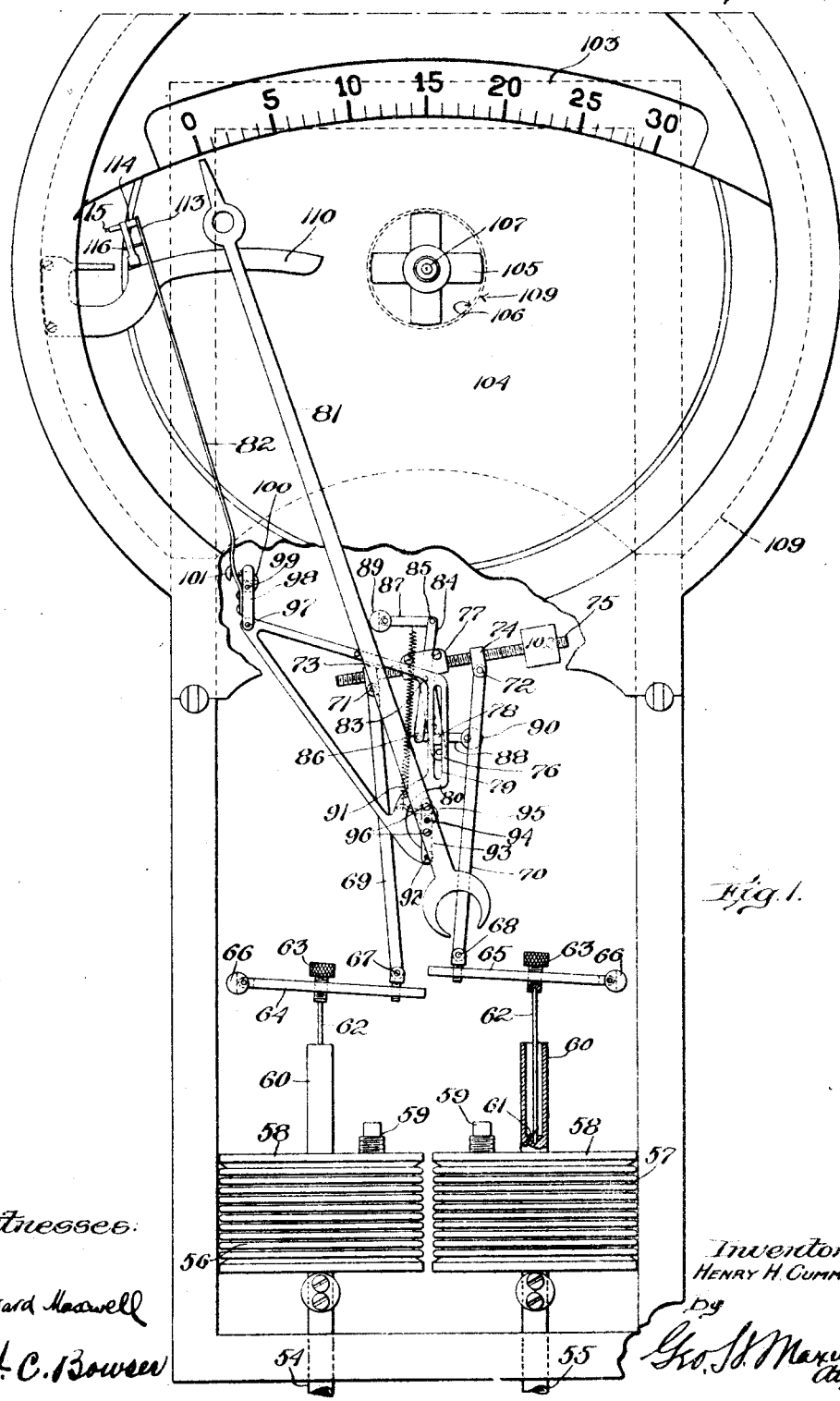

H. H. CUMMINGS.
SHIP'S SPEED OR CURRENT INDICATOR AND RECORDER.
APPLICATION FILED DEC. 6, 1909.

1,128,297.

Patented Feb. 16, 1915.
4 SHEETS—SHEET 1.

Witnesses:
Edward Maxwell
H. C. Bowser

Inventor:
Henry H. Cummings,
by
Geo. H. Maxwell
Atty.

H. H. CUMMINGS.
SHIP'S SPEED OR CURRENT INDICATOR AND RECORDER.
APPLICATION FILED DEC. 6, 1909.
1,128,297.
Patented Feb. 16, 1915.
4 SHEETS—SHEET 2.
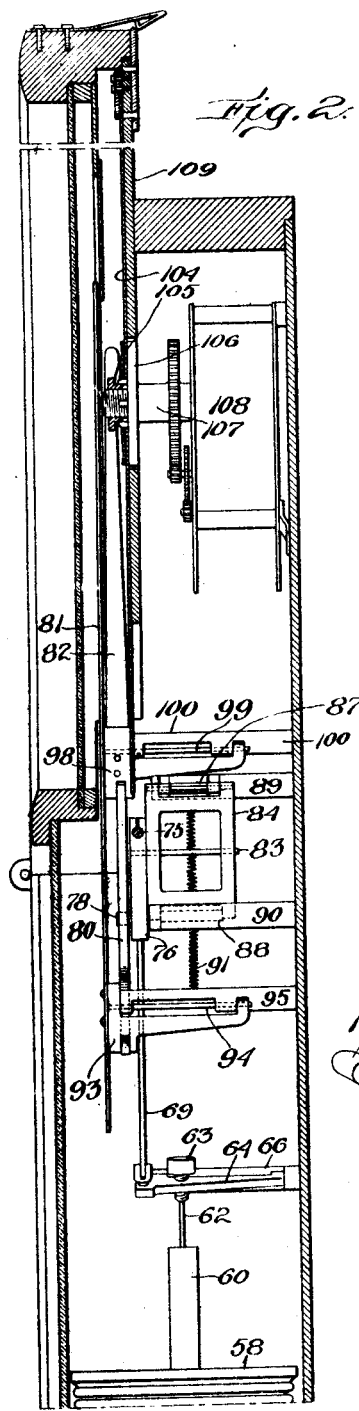
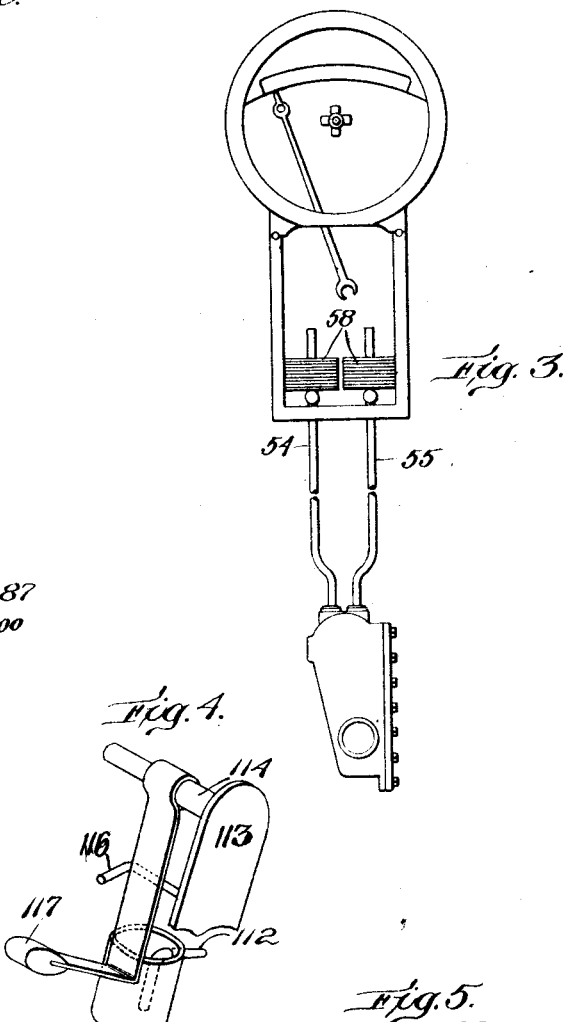
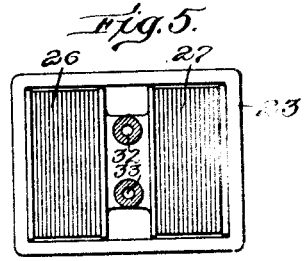
Witnesses:
Edward Maxwell
H. C. Bowser
Inventor.
Henry H. Cummings,
by Geo. H. Maxwell, Atty.

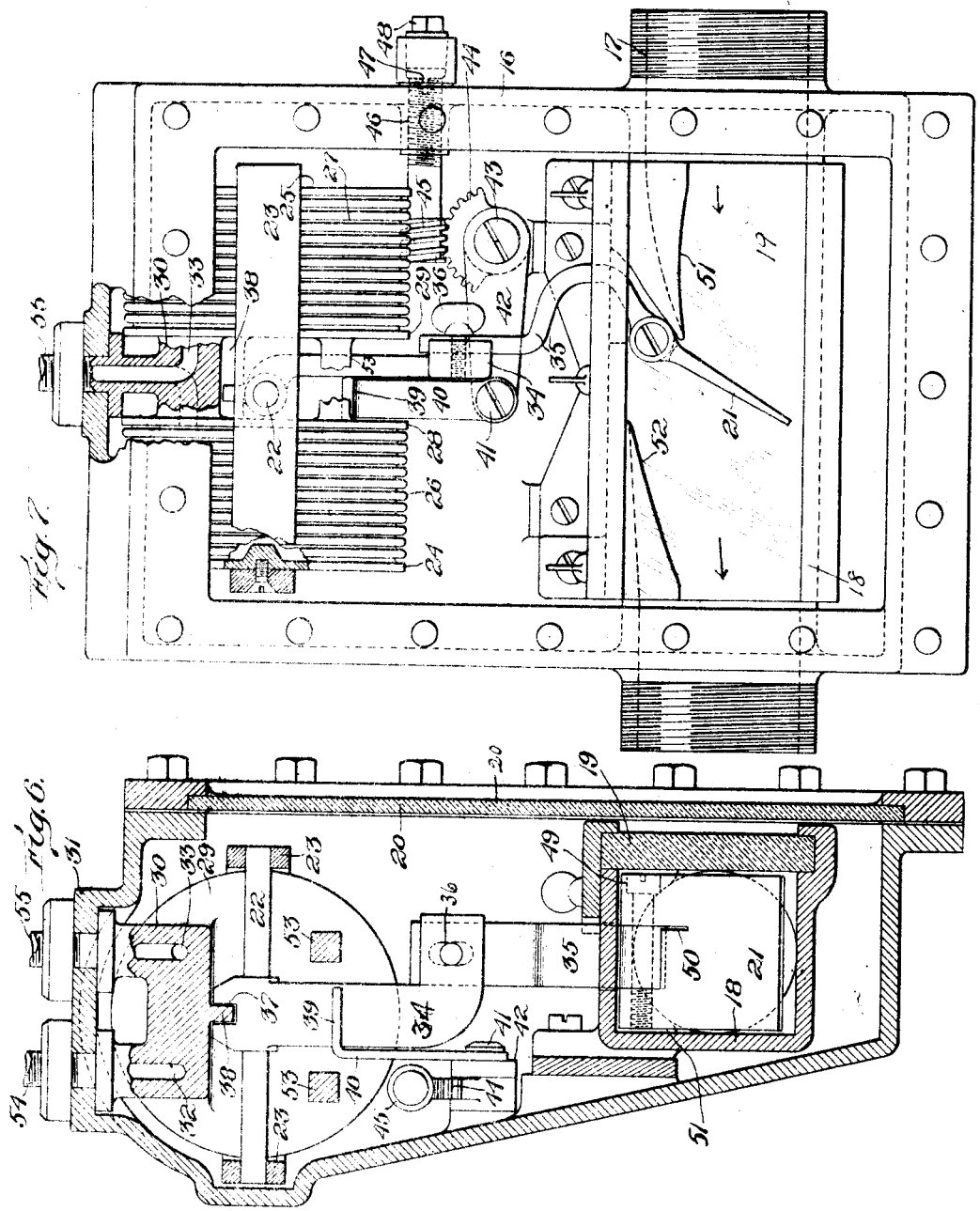

H. H. CUMMINGS.
SHIP'S SPEED OR CURRENT INDICATOR AND RECORDER.
APPLICATION FILED DEC. 6, 1909.
1,128,297.
Patented Feb. 16, 191...
4 SHEETS—SHEET 4.
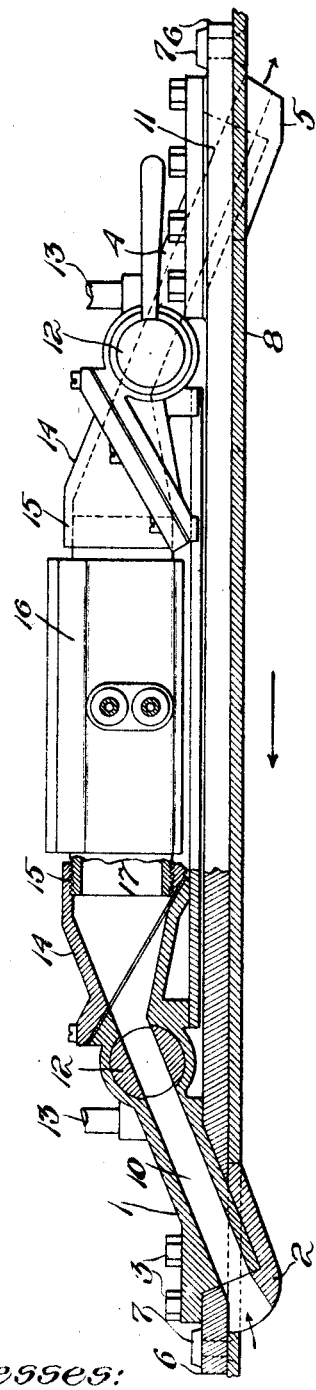
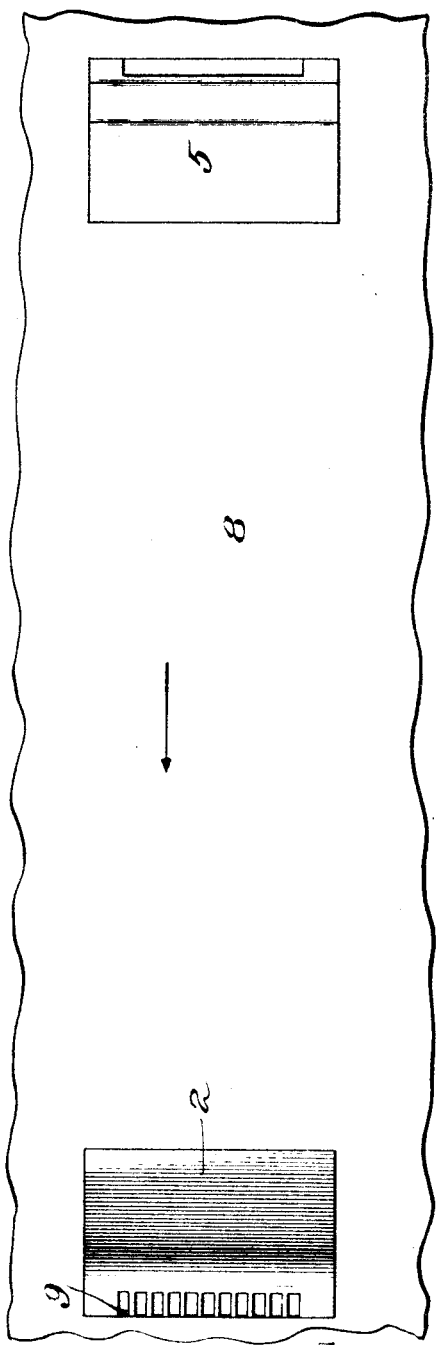
Witnesses:
Edward Maxwell
N. C. Bowser
Inventor:
Henry H. Cummings:
by Geo. H. Maxwell, atty.

UNITED STATES PATENT OFFICE.

HENRY H. CUMMINGS, OF NEWTON, MASSACHUSETTS.

SHIP'S-SPEED OR CURRENT INDICATOR AND RECORDER.

1,128,297.  Specification of Letters Patent.  Patented Feb. 16, 1915.

Application filed December 6, 1909. Serial No. 581,531.

*To all whom it may concern:*

Be it known that I, HENRY H. CUMMINGS, a citizen of the United States, and resident of Newton, in the county of Middlesex and State of Massachusetts, have invented a Ship's-Speed or Current Indicator and Recorder, of which the following description, in connection with the accompanying drawings, is a specification, like letters on the drawings representing like parts.

My invention has for its object the indicating and recording of the speed with which a vessel goes through the water, or the current or flow of the water at the side of the vessel, or the current or flow of a river.

My invention is distinguished in being provided with transmitting means which is uninfluenced by the up and down pounding movement of the vessel, and it is further distinguished in having means located at an opening in the hull of the vessel, which responds at that point directly to the current or flow of the water and then transmits the measurement from that point to wherever the recording instrument may be located, without any liability of being further influenced by any special conditions of the sea. Preferably also I provide a balanced hydrostatic compensating mechanism which gives extreme accuracy and reliability of indicating and recording movements. Further advantages will be set forth in connection with the following description of the preferred embodiment of my invention.

In the drawings, Figure 1 is a front view of the upper portion of the apparatus; Fig. 2 is a central vertical sectional view thereof; Fig. 3 is a front elevation of the upper and lower parts showing their relation to each other; Fig. 4 is a detail view of the upper end of the recording finger and pen; Fig. 5 is a top plan view of the bellows pump; Figs. 6 and 7 are views of the lower portion of the apparatus, Fig. 6 being an approximately central vertical sectional view and Fig. 7 a front elevation with the front plate removed; Fig. 8 is a horizontal sectional view showing the water receiving portion or lower part of the apparatus in operative position in the vessel; and Fig. 9 is a view thereof in side elevation looking at the outside of the vessel.

Referring to Figs. 6–9, I secure to the hull of the vessel at any suitable point, preferably at the side thereof at a proper distance below the water line, an inlet casting 1, herein shown as provided with an external cap portion 2 bolted thereto at 3, and a substantially similar outlet 4, 5, each herein shown as having ears 6 riveted at 7 to the adjacent plate of the hull 8. The part 2 which points toward the bow is provided with a grating 9 to permit the free entrance of the water but prevent the entrance of undesired matter. Passages 10, 11 permit the free flow of water, being controlled by sea cocks 12 and provided with drip pipes 13. At the inner ends of said water passages are tightly clamped similar castings 14 having threaded engagement at 15 with a central box 16 through which is a passage 17 which forms with the passages 10, 11 a continuous free passage for the flow of the water from the sea through the apparatus and out again, the casting 2 serving to catch the water and compel it to flow through the passage when the vessel is moving in the direction of the arrow, Fig. 8, or the current is moving in an opposite direction. An inclosure, herein shown as a rectangular tube 18, Fig. 6 correspondingly restricts the size and shape of the passage 17 within the box, being closed, preferably by a plate 19 of glass, and the whole box inclosed by a removable cover 20. Within the inclosure 18 projects a paddle-like end 21 Figs. 6 and 7 of a lever which is pivotally supported at its upper end on a rod 22 mounted at its ends in a rectangular frame 23 secured at its opposite ends to end plates 24, 25 of two pumps, herein shown as metal bellows 26, 27 which terminate at their inner ends or are secured to plates 28, 29 depending from a central casting 30 secured to the top 31 Fig. 6 of the box and provided with ports 32, 33 opening respectively into the pump 26 and the pump 27. The lever has movement through the open top of part 18 and is preferably made in two parts 34, 35 adjustably clamped together at 36, and is held central by the engagement of its upper notched end 37 with a tongue 38 of the casting 30. The lever rocks on a fulcrum 39, herein shown as consisting of the outturned end of an arm 40 pivoted at 41 to a sector lever 42 mounted on a fixed pivot 43 and having its sector 44 operated by a worm 45 on the inner end of a stud, which is preferably threaded at 46 in the box and provided with a slotted end 47 to be operated by a screw driver, being further sealed against the escape of water by a nut 48. Rotation of the worm 45 serves to change the fulcrum of the lever, and the rocking of said lever on said fulcrum under the impact of the water against the lower end 21 of the lever operates the pumps. Said lower end 21 preferably projects normally at about the angle shown in Fig. 7, as this angle facilitates the escape of the water through the passage and yet under ordinary conditions gives sufficient leverage for the purpose of the invention, but I prefer to provide for changing the angle of the paddle-like end 21 so that it may be made to stand more nearly vertical if desired, and to this end it is made separate from the part 35 of the lever, being clamped thereto by a clamping bolt 49 as clearly shown in Fig. 6, a saw-cut 50 coöperating to aid in permitting the parts to be clamped together immovably.

A deflector 51 in the roof of the passage 17 serves to deflect the water hard against said end 21, and a second deflector 52 coöperates in facilitating the escape of the water at the outgoing end of said passage 17. The two plates 28 and 29 Fig. 7 are stationary, being held rigid at their upper ends by the casting 30 and at their lower ends by heavy braces or cross bars 53 so that the back and forth movements of the frame 23 under the action of the operating lever operates the pumps, compressing the pump 26 and expanding the pump 27 so as to force liquid up through the port 32 and exhaust liquid down through the port 33 when the lever end 21 is moved to the left, Fig. 7, in response to a strong flow of water through the passage 10, 17 and 11. Pipes 54, 55 communicate from said ports to whatever part of the vessel the visual portion of the indicator and recorder is located, as for instance in the chart room. Referring now to Figs. 1–3, it will be seen that these pipes open at their upper ends into bellows 56, 57 respectively, preferably made of metal the same as the pumps, and constituting in effect movable diaphragms of an exceedingly sensitive nature. Each of these is provided with a top plate 58, a filling plug 59 (alcohol being preferably used as the elastic fluid medium in the pipes, diaphragms, and pumps), and an upwardly projecting sleeve 60 having a conical seat 61 delicately engaged by a slender stem or pin 62 whose upper end rests in the hollowed under end of an adjusting screw 63. These screws 63 are mounted in levers 64, 65 respectively pivoted at their outer ends in stationary posts 66 and projecting inwardly toward each other, where they are adjustably and pivotally connected at 67, 68 to links or lifting rods 69, 70 pivoted at 71, 72 to nuts 73, 74 threaded on the opposite ends of a right and left threaded rod 75. A downwardly projecting finger or arm 76 is mounted at 77 on said rod 75 so as to permit said rod to turn freely but not move lengthwise therein, said finger having a pin 78 projecting freely in a slot 79 of a light frame 80 whose lateral movements convey to the pointer 81 and the marker or recording arm 82 the movements transmitted by the sensitive fluid columns previously described. The finger 76 is pivoted at 83 on a frame 84 pivoted at its opposite ends 85, 86 to frame links 87, 88 pivoted at their opposite ends to stationary posts 89, 90 so as to permit free up and down movement of the parts connected to the screw rod 75 without tending to shift the pivot 83 laterally in either direction. A spring 91 maintains all the aforesaid mechanism under downward tendency. The light frame 80 is pivotally connected at 92 to a link or arm 93 pivoted at 94 to a stationary post 95 and secured by screws 96 immovably to the pointer 81. At its upper end the frame 80 is pivotally secured at 97 to a link or arm 98 which is pivotally connected at 99 to a stationary post 100. The pen-carrying arm 82 is secured to this arm 98 and made adjustable with reference thereto by a set screw 101. A counter weight 102 is adjustable on the screw rod 75 and serves to counterbalance the movement of the ends or pointer members 81, 82. A scale 103 coöperates with the pointer 81 to indicate the miles or other linear units of the current movement or vessel's travel which is being measured. Behind this a chart sheet 104 is clamped by any suitable clamping means 105 against a rotary plate 106 whose post 107 is given movement by any usual clockwork 108. This paper is held flat against a back plate 109 by a guide 110 at the point where the record is to be made. This record is made by any permanent marking means as a stylus or pen 112, Fig. 4, but to adapt the same better to the exacting requirements herein concerned, I make the upper end of the arm 82 as a permanent magnet 113 and provide a tubular armature 114 to slip on a pin 115 which projects from said end 113 so that the pen and ink, etc., are held on by this means, an angularly bent wire 116 serving to direct the ink pot and stylus when swung against the paper by the weight 117. This recording device is not herein claimed, having been divided from this case to be claimed in another case.

In use, as the vessel is driven through the sea or the water flows past the vessel, a stream is deflected therefrom by the casting 2 which projects slightly from the side of the vessel and caused to flow through the passage 10 into the passage 17 of the box and thence out through the passage 11 into the sea again, this continuously moving stream having a definitely predetermined cross sectional area. As the stream strikes the lower part 21 of the operating lever, it moves said lever in exact response to the velocity of the current or speed of the vessel. The lever turns on its fulcrum 89, Fig. 6, thereby moving the frame 23 lengthwise to the right, Fig. 7. This compresses the pump 26 and forces the contained alcohol or other transmitting fluid up the pipe 54 and correspondingly expands the diaphragm 56, which operates to raise the link 69 and thereby rock the threaded rod 75 and arm 76 on the pivot 83 which shifts the frame 80 to the left, Fig. 1, and delicately swings the pointer 81 to the right by the turning of the link or arm 93 on its pivot 94, and the marker 82 to the right by the turning of its link or arm 98 on the pivot 99. This operation is further facilitated by the opposite movement of the diaphragm 57 due to the enlarging or exhaust movement of the pump 27 which exactly corresponds to the opposite movement of the pump 26 and hence contracts the diaphragm 57 to exactly the same extent as the diaphragm 56 is expanded. By having the two columns 54, 55 of liquid and the two expansible diaphragms 56, 57 and their connected mechanisms, changes of temperature and hence of volume of liquid cannot introduce any error or change in the indicating and recording positions of the members 81, 82. An expansion of the fluid serves simply to raise the pivot 83 in a substantially vertical line under the influence of the two sets of similar mechanisms which extend from said two diaphragms. A contraction of the liquid, due to a fall of temperature, simply causes said pivot 83 to lower in the same vertical line and hence does not alter in any way the indicating and recording accuracy of the instrument. The pin 78 from the arm 76 is free at all times to move up and down in the vertical slot 79, so that a change of position in a vertical plane of the pivot 83 and hence of the pin 78 does not alter the operative effect produced on the frame 80 when said pin 78 is moved laterally in one direction or the other in response to the flow of water through the sea passages 10, 17 and 11. This arrangement whereby the pivot 83 has a considerable vertical range without moving the frame 80, and whereby said frame and consequently the pointer 81 may be accurately moved by the swinging arm 76 from differen vertical positions of said pivot 83, is believed to be a distinct novelty in the art and I desire to claim the same broadly. In the claims I have used the words indicating means generically to denote means responding to the transmitting mechanism, irrespective of whether it indicates visually or not or makes a permanent record or not.

The arrangement of the two fluid columns, with the provision for their contraction or expansion without changing the indicating actuations, enable these two columns to constitute what I have termed a balanced hydrostatic compensating mechanism, only the differences in height of the fluid columns having any effect on the indicating apparatus, such differences being thus effectual, irrespective of the fluctuations in both columns due to temperature changes.

Having described my invention, what I claim as new and desire to secure by Letters Patent is:

1. An apparatus for indicating the speed of a ship through the water, comprising a speed indicating device, balanced hydrostatic compensating mechanism having a plurality of fluid columns connected with said device to actuate the same, means to compensate for changes of temperature throughout the length of said columns while maintaining said balanced relation and means extending into a path of water flow movable to different positions and arranged to transmit such movement to the said hydrostatic compensating mechanism.

2. An apparatus for indicating the speed of a ship through the water, comprising a speed indicating device, balanced hydrostatic compensating mechanism having two fluid columns and means to compensate for changes of temperature throughout the length of said columns while maintaining said balanced relation, movable means having a part extending into a path of water flow and movable thereby to different positions, said means being connected with said fluid columns to transmit impulse therethrough in response to variations of pressure on said movable means, and said speed indicating device being connected with said hydrostatic compensating mechanism.

3. An apparatus for indicating the speed of a ship through the water, comprising a speed indicating device, balanced hydrostatic compensating mechanism having two fluid columns and means to compensate for changes of temperature throughout the length of said columns while maintaining said balanced relation, movable means having a part extending into a path of water flow and movable thereby to different positions, said means being connected with said fluid columns to transmit impulse therethrough in response to variations of pressure on said movable means, said speed indicating device being connected with said balanced hydrostatic compensating mechanism and arranged to be responsive to the variations in pressure on said movable means, transmitted through the two fluid columns irrespective of the height of said fluid columns due to changes in temperature throughout the lengths of said fluid columns.

4. An apparatus for indicating the speed of a ship through the water, comprising a speed indicating device, balanced hydrostatic compensating mechanism having two fluid columns and automatic means to compensate for changes of temperature throughout the length of said columns while maintaining said balanced relation, movable means having a part extending into a path of water flow and movable thereby to different positions, said means being connected with said fluid columns to transmit impulse therethrough in response to variations of pressure on said movable means, said speed indicating device being connected with said hydrostatic compensating mechanism.

5. An apparatus for indicating the speed of a ship through the water, comprising a speed indicating device, balanced hydrostatic compensating mechanism having two fluid columns and automatic means to compensate for changes of temperature throughout the length of said columns while maintaining said balanced relation, movable means having a part extending into a path of water flow and arranged to be movable thereby in a forwardly and backwardly direction to positively actuate both said two fluid columns by either movement, and an adjustable connection between said part and the fluid columns.

6. In an apparatus of the kind described for indicating the speed of a ship through the water, a passageway for the flow of water therethrough directly from the sea, a member extending thereinto and movable to different positions in response to variations of water pressure, speed indicating means, two separate closed fluid transmission means actuated respectively by movement of said member in opposite directions, and connections, including a movable fulcrum from both said fluid transmission means to said indicating means, said connections being interconnected with said fulcrum to constitute a compensating device for variations in said transmission means.

7. In an apparatus of the kind described, a movable current indicating member, two closed liquid columns with means for supporting the same, a movable diaphragm actuated by each column, connections including compensating means between said two diaphragms and said movable indicating member to coöperate with said two columns in compensating for the effects due to changes of temperature, and means responsive to the current flow for simultaneously actuating said liquid columns in opposite directions.

8. In an apparatus of the kind described, a movable current indicating member, two closed liquid columns with means for supporting the same, a movable diaphragm actuated by each column, connections including compensating means between said two diaphragms and said movable indicating member to coöperate with said two columns in compensating for the effects due to changes of temperature, means responsive to the current flow for simultaneously actuating said liquid columns in opposite directions.

9. In an apparatus of the kind described, a closed receptacle containing current indicating means, transmission mechanism for operating said means, a pivoted lever in the path of current flow and responsive thereto for actuating said transmission mechanism, and means for shifting the fulcrum of said lever, including a member extending outside said receptacle to operate said fulcrum shifting means.

10. In an apparatus of the kind described, indicating means, transmission mechanism for operating said means, a pivoted lever arranged to be responsive to a current flow for actuating said transmission mechanism, and means including a worm and sector for shifting the fulcrum of said lever.

11. In an apparatus of the kind described, a movable current indicating member, a laterally shiftable device with reference to which said member turns, engaging means for shifting said device, operating means for actuating said engaging means, including two independently expansible transmission members, and means responsive to the expansion and contraction of said transmission members under changes of temperature arranged for the movement of said engaging means at right angles to the direction of said shifting movement without operating said shiftable device.

12. In an apparatus of the kind described, two transmission members, a transverse rod centrally pivoted, connections from said transmission members to said rod at either side of its pivot, arranged to permit said pivot to move vertically, a shiftable device movable transversely of said movement of the pivot, an arm extending laterally from said rod in engagement with said shiftable device, whereby movement of the arm actuates the device and a movable indicating member actuated by the shifting movement of said device.

13. An apparatus for indicating the speed of a ship through the water, comprising a pointer, a carrier therefor, a lever to actuate the carrier, and operative connections between said carrier and lever, comprising a pin on the lever and coöperating means on said carrier permitting a substantially free vertical movement of said pin independently of any actuating movement of said carrier, and mechanism to move said lever in accordance with the speed of the ship.

In testimony whereof, I have signed my name to this specification, in the presence of two subscribing witnesses.

HENRY H. CUMMINGS.

Witnesses:
GEO. H. MAXWELL,
M. J. SPALDING.